(12) United States Patent
Davis et al.

(10) Patent No.: US 6,775,770 B1
(45) Date of Patent: Aug. 10, 2004

(54) PLATFORM AND METHOD FOR SECURING DATA PROVIDED THROUGH A USER INPUT DEVICE

(75) Inventors: Derek L. Davis, Phoenix, AZ (US); Shawn C. Beckman, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/476,059

(22) Filed: Dec. 30, 1999

(51) Int. Cl.[7] .................................................. H04L 9/00
(52) U.S. Cl. ..................... 713/156; 713/168; 713/175; 713/176
(58) Field of Search ............................... 713/156, 168, 713/175, 176

(56) References Cited

U.S. PATENT DOCUMENTS

| | | | | |
|---|---|---|---|---|
| 5,594,798 A | * | 1/1997 | Cox et al. .................. 380/257 |
| 5,918,007 A | * | 6/1999 | Blackledge et al. ........ 713/200 |
| 5,970,227 A | * | 10/1999 | Dayan et al. ............... 713/200 |
| 5,974,142 A | * | 10/1999 | Heer et al. .................. 379/442 |

* cited by examiner

*Primary Examiner*—Thomas R. Peeso
(74) *Attorney, Agent, or Firm*—Rob Anderson (57) ABSTRACT

A platform and a corresponding method for protecting the integrity of data transferred between the user input device and a secure processing unit. In one embodiment, this can be accomplished by establishing a virtual secure path between a device controller of the user input device and the secure processing unit. Thereafter, when sensitive information is input by the user via the user input device, the device controller is placed in a first mode of operation to securely transfer the sensitive information from the user input device to the secure processing unit over the virtual secure path. Additionally, a security indicator is placed in an Active state to indicate to the user that the sensitive information is being securely transferred to the secure processing unit.

32 Claims, 8 Drawing Sheets

PLATFORM AND METHOD FOR SECURING DATA PROVIDED THROUGH A USER INPUT DEVICE

BACKGROUND

1. Field

The present invention relates to the field of cryptography. More particularly, the present invention relates to a platform and method for protecting the integrity of data associated with an electronic transaction.

2. General Background

Over the past few years, more businesses and individuals are performing electronic transactions over a network such as a wide area network (e.g., Internet) or a local area network (e.g., Intranet). One type of electronic transaction involves the transfer of confidential information such as financial data including a credit card account number, a bank account routing number, monetary amounts and the like. Before transmission, the financial data is often entered via the keyboard or another input device. Likewise, such data is typically displayed on a monitor screen. This enables the sender to carefully review the financial data for accuracy before transmission.

It is well known that a personal computer accepts data and displays data under the control of software. Before completing an electronic transaction, software running on a personal computer (PC) causes certain data associated with the transaction to be displayed. However, if the software becomes corrupted (e.g., the functionality of the software is illicitly modified), each party to an electronic transaction may be susceptible to fraud.

It is recognized that a software virus may be devised to corrupt an application that controls the display of data. For example, a software virus may be configured to alter (i) keystrokes prior to their reception by an application executed by the host processor, and/or (ii) data provided by the host processor prior to display on a monitor. Thus, even though the keystrokes input by the user have been altered, it is difficult to detect any alteration.

In a hypothetical PC banking application, the user inputs a particular monetary amount to be transferred, an account number targeted as the destination of the monetary transfer, and an account number acting as the source for the monetary transfer. A software virus may be configured to intercept and modify the user input, thereby directing the transfer to an alternative account. Simultaneously, the virus may modify the data actually displayed by the banking application to reflect the account number specified by the user. Thus, the account number targeted to receive the monetary transfer may differ from the actual account number provided to the banking application, and yet the user has no indication of such tampering.

Therefore, it would be desirable to implement an electronic system and method for ensuring that data associated with the electronic transaction is protected from the moment of being input and is accurately displayed prior to transmission over a communication link.

SUMMARY

In one embodiment, the invention is a method. A virtual secure path is established between a device controller of a user input device and a secure processing unit. Sensitive information is input via the user input device. The device controller of the user input device is placed into a first mode of operation to securely transfer the sensitive information from the user input device to the secure processing unit via the virtual secure path.

BRIEF DESCRIPTION OF THE DRAWINGS

The features and advantages of the present invention will become apparent from the following detailed description of the present invention in which.

DETAILED DESCRIPTION

The present invention relates to a platform and method for protecting the integrity of data associated with a transaction and accurately displaying the data prior to transmission. In the following description, certain terminology is used to describe certain technology. For example, a "platform" is electronic hardware having input, display, and processing functionality such as, for example, a computer (e.g., desktop, laptop, personal digital assistant, server, etc.), a set-top box, an automated teller machine (ATM), a cash register, and the like. A "processing unit" includes a microprocessor, a digital signal processor, a microcontroller, a state machine and the like. "Information" is defined as one or more bits of data, address, and/or control. The term "secure" or any tense thereof indicates that it is virtually computationally infeasible for an unauthorized individual to either access information in an non-encrypted format or successfully perpetrate fraud by tampering with such information without any capability of detection.

Figure 1:
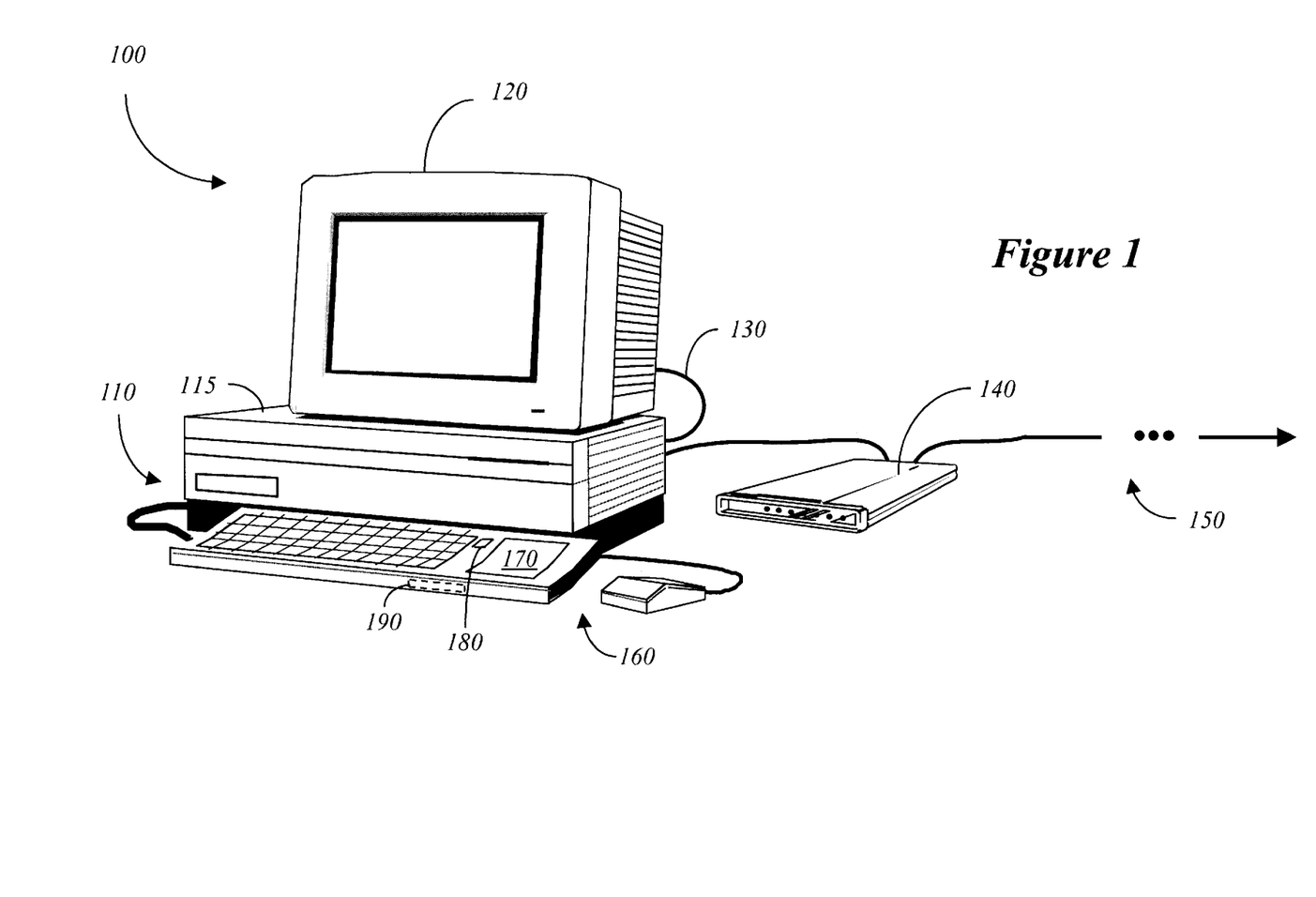
FIG. 1 is a perspective view of an embodiment of a platform employing the present invention.

Referring to FIG. 1, a perspective view of an embodiment of a platform 100 employing the present invention is shown. Platform 100 comprises a computer 110 to process data and display such data on a monitor 120. Monitor 120 may include a flat panel display (e.g., liquid crystal display, etc.), a cathode ray tube, or any other type of display technology. Computer 110 further includes a transceiver device 140 to receive and/or transmit information over a communication link 150. Transceiver device 140 is either a modem situated external to computer chassis 115 (as shown) or a circuit card (e.g., a modem card, networking card, etc.) placed within computer chassis 115. Communication link 150 may include telephone lines (e.g., POTS lines), cable, optical fiber, one or more wireless channels and the like.

Referring still to FIG. 1, for this embodiment, computer 110 receives as input information from one or more user input devices 160. User input device 160 may be integrated with or physically remote from chassis 115. Examples of a user input device 160 include, but are not restricted or limited to any of the following: a keyboard, a keypad, a trackball, or a mouse. User input device 160 includes a display 170 (e.g., a liquid crystal display or another flat display technology) and a security indicator 180 (e.g., a light emitting diode). As an option, user input device 160 includes an optional token reader 190 such as a smart card reader. It is contemplated that user input device 160 may include two peripherals, one peripheral (e.g., mouse) from which data may be input and another peripheral (e.g., keyboard) from which data may be securing output thereto and displayed on display 170. In this illustrative example, two independent virtual secure paths are used; namely, one for "input" from the mouse and one for "output" to the keyboard-based display.

Figure 2:
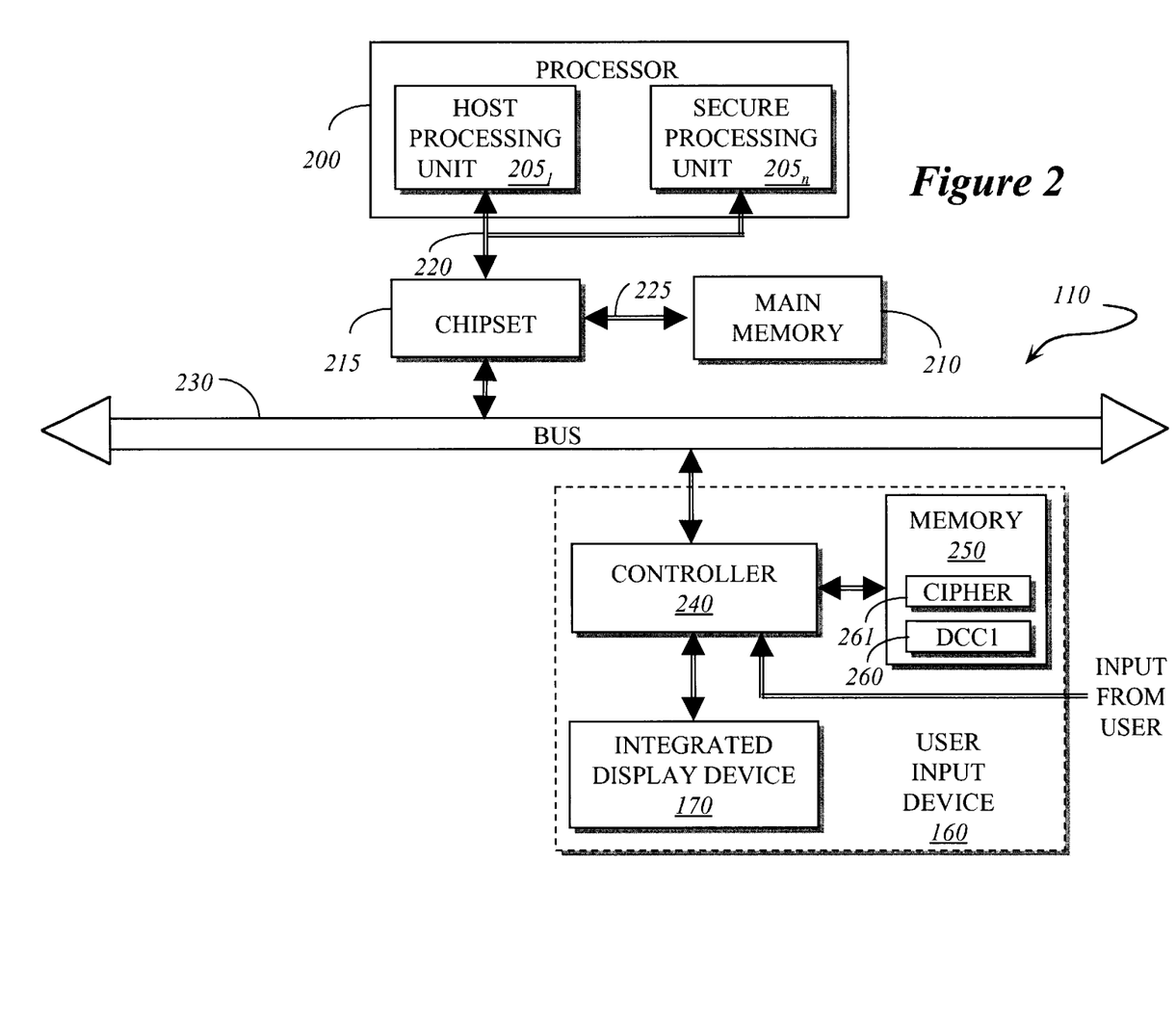
FIG. 2 is a block diagram of an illustrative embodiment of a computer of the platform of FIG. 1.
Figure 3:
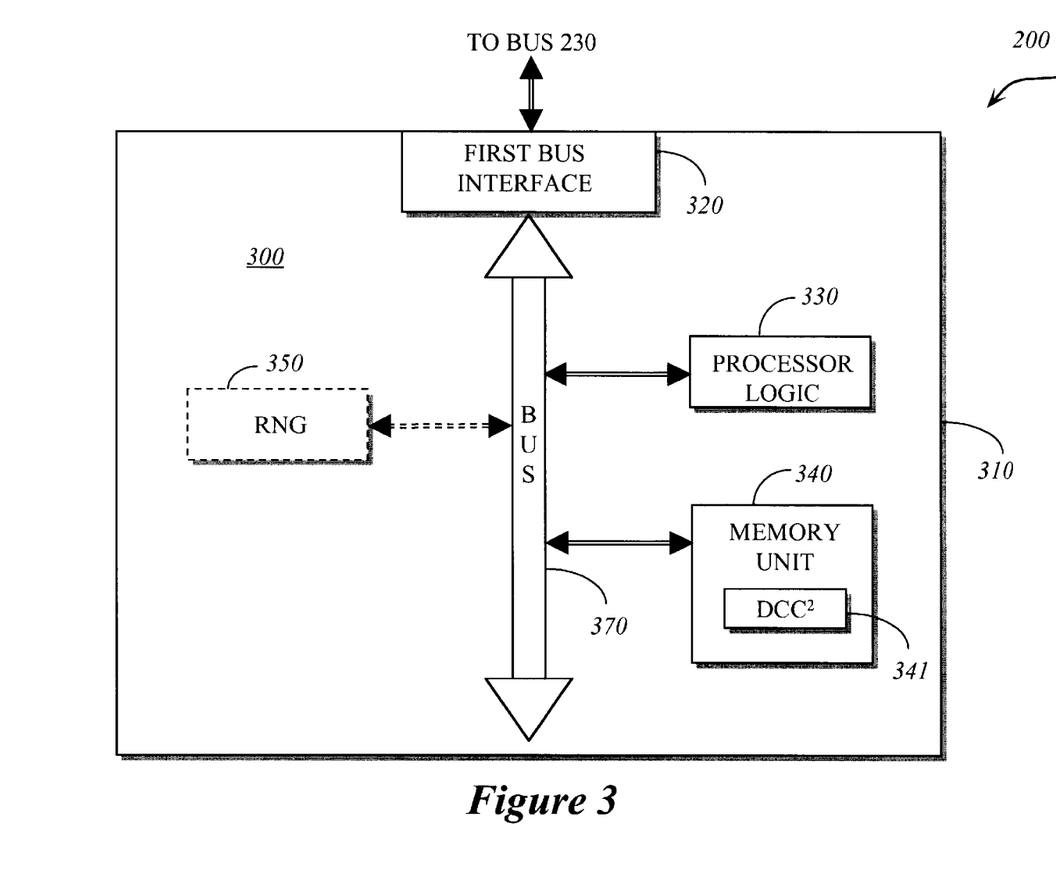
FIG. 3 is a block diagram of an illustrative embodiment of the secure processing unit implemented within the computer of FIG. 2.

Referring now to FIG. 2, a block diagram of an illustrative embodiment of computer 110 of platform 100 is shown. Computer 110 comprises a processor 200 and a main memory 210 coupled together by a chipset 215. Processor 200 includes M processing units $205_1$–$205_M$ coupled together by a host bus 220 as shown (where "M"≧1). Herein, processing unit $205_1$ includes a host processor and a processing unit $205_M$ acting as a secure processor as shown in FIG. 3 and described below. Of course, it is contemplated that processor 200 may include a single processing unit (host) capable of operating in a special mode to securely process incoming information. Thus, the single processing unit would be considered a secure processing unit during the special mode and a host processing unit during the other modes of operation. Also, it is contemplated that processing unit $205_M$ may be coupled to an input/output (I/O) bus 230 in lieu of host bus 220.

As further shown in FIG. 2, main memory 210 of computer 110 includes dynamic random access memory (DRAM), static random access memory (SRAM), and/or or any other memory type. In part, main memory 210 is responsible for storing a portion of software used to conduct transactions over communication link 150. Chipset 215 operates as an interface between a plurality of buses; namely host bus 220, a memory bus 225 and an input/output (I/O) bus 230.

As shown, I/O bus 230 enables communications between processor 200 and user input device 160 (e.g., a keyboard, and/or a keypad, etc.). I/O bus 230 may be implemented as a Peripheral Component Interconnect (PCI) bus at any selected frequency (e.g., 66 megahertz "MHz", 100 MHz, etc.), Industry Standard Architecture (ISA) bus, a Universal Serial Bus or any other bus architecture. Although I/O bus 230 is shown as a single bus, it may include multiple buses coupled together through bridge circuitry in which user input device 160 is coupled to at least one of the multiple buses.

Referring back to FIGS. 1 and 2, in one embodiment, user input device 160 may be implemented as a keyboard integrated with display device 170. Display device 170 is lesser in physical dimensions than the display screen of monitor 120 of FIG. 1. Also, display device 170 operates independently from monitor 120 in order to display information sensitive to a pending transaction in a selected format (e.g., in alphanumeric text, symbols, etc.). The software executable by processor 200 may be specifically coded for distinguishing what information is sensitive. Examples of the "sensitive information" include an account number and/or a monetary amount as used by banking software.

Additionally, user input device 160 includes a device controller 240 and an internal memory 250. As shown, device controller 240 is placed within user input device 160 and coupled to I/O bus 230. Alternatively, device controller 240 may be part of a token (e.g., any readable, data carrying card such as a smartcard) capable of being inserted into token reader 190 of user input device 160. For this embodiment, memory 250 may be configured to contain a digital certificate chain (DCC1) 260 and a cipher function 261 (e.g., Data Encryption Standard "DES" function).

Device controller 240 operates in one of two modes: a first mode (Secure Data Entry) or a second mode (Standard Entry). During the Secure Data Entry mode, when the security indicator is placed in an Active state as described below, information is provided to device controller 240 by the user depressing keys of a keyboard, selecting an object, and the like. This information is routed from device controller 240 to secure processing unit $205_M$ over a secure virtual path established between these components. During a Standard Entry mode, however, the information is simply provided to software running on secure processing unit $205_M$.

Referring now to FIG. 3, processing unit $205_M$ of FIG. 2 comprises one or more integrated circuits 300 encapsulated within a device package 310 for protection against tampering and harmful contaminants. For example, integrated circuits 300 comprise a bus interface 320, processor logic 330, a memory unit 340 and an optional random number generator (RNG) 350. In this embodiment, all of these components 320, 330, 340 and 350 are placed within package 310 to increase the difficulty in accessing sensitive information through a virus attack.

As shown in FIG. 3, memory unit 340 includes non-volatile memory, which retains at least a digital certificate chain 341 even when supply power is discontinued. Digital certificate chain (DCC2) 341 as well as DCC1 260 of FIG. 2 may be configured in accordance with CCITT Recommendation X.509 entitled "The Directory—Authentication Framework" (1988). It is contemplated that memory unit 340 may also include volatile memory to provide temporary storage for processor logic 330.

Figure 4:
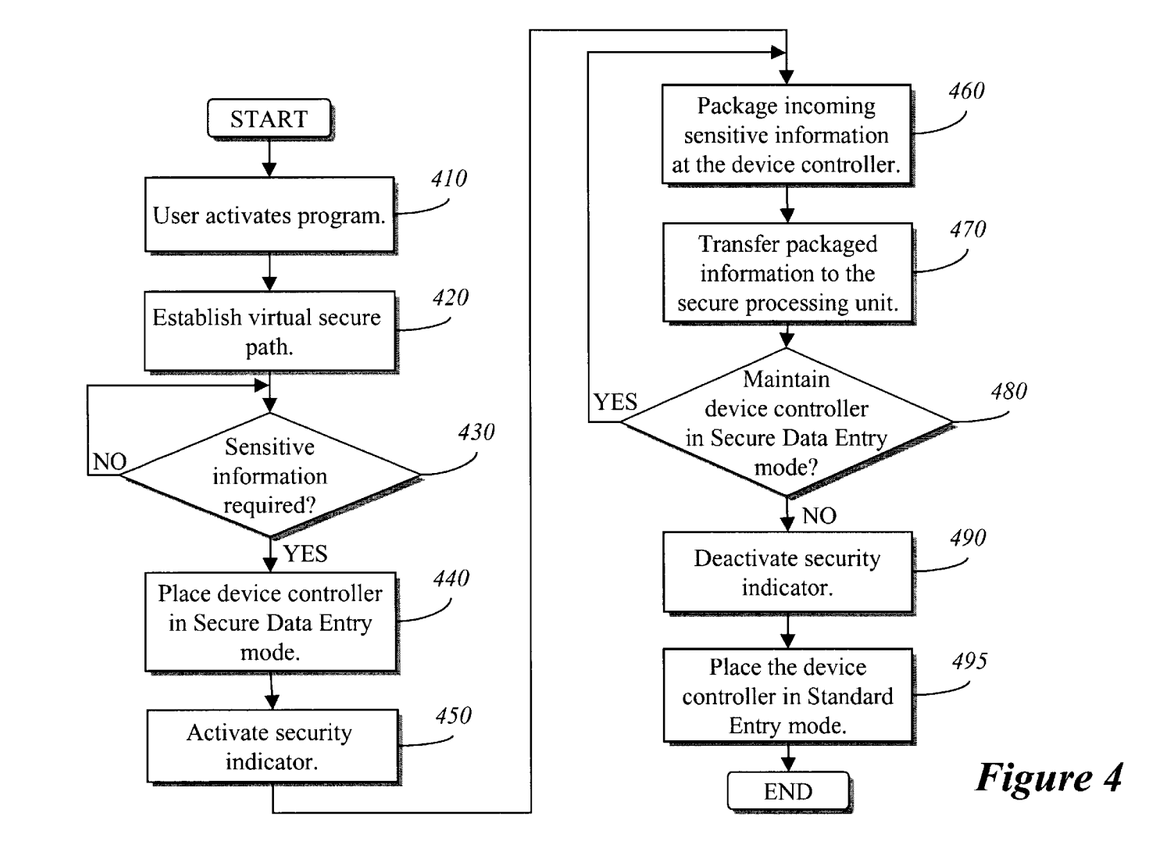
FIG. 4 is an illustrative embodiment of a flowchart describing the operations for protecting the integrity of the data from input until display.

Referring now to FIG. 4, an illustrative embodiment of a flowchart is shown to describe the operations for protecting the integrity of the data from input until display. In this embodiment, after power-up of the computer, the user activates a program for execution by the host processing unit. For example, the program performs a financial transaction over the Internet. The transaction may involve a credit card purchase.

Upon activation of the program, a virtual secure path is attempted between the user input device and the secure processing unit (block 410). Of course, the virtual secure path may be established any time prior to routing of sensitive information to the secure processing unit. In one embodiment, the virtual secure path is established by both the secure processing unit and the device controller performing two general operations; namely, (1) mutual authentication (challenge/response protocol) and (2) session key development using the digital certificate chain as described in FIGS. 5 and 6.

At some point during this transaction, the user may be required to enter sensitive information (e.g., a credit card number) via the user input device (blocks 420 and 430). The determination of whether certain information is sensitive may be performed through a number of techniques. For example, the activated program may be coded to know what information is sensitive. The manner in which information is deemed to be sensitive is a design choice.

At that time, one of the processing units (e.g., a host processing unit or secure processing unit) initiates a control signal to place the device controller in a Secure Data Entry mode (block 440). Also, the security indicator is placed in an Active state (block 450). For example, in the Active state, the security indicator may be illuminated or play an audible sound. This allows the user to perceive that the sensitive information will be routed to the secure processing unit in a secure manner.

The device controller receives the sensitive information and packages this information for transmission to the secure processing unit via the virtual secure path (blocks 460 and 470). This "packaging" may include encryption of the data under the previously established session key. This may also include production of an integrity check value (ICV) using the shared session key as described below. The device controller remains in the Secure Data Entry mode until signaled by the host processing unit or secure processing unit to return to the Standard Entry mode where data is routed to the program directly (block 480). In particular, upon receipt of such signaling, the security indicator is deactivated and then the host processing unit or the secure processing unit is placed in the Standard Entry mode (blocks 490 and 495).

Figure 5:
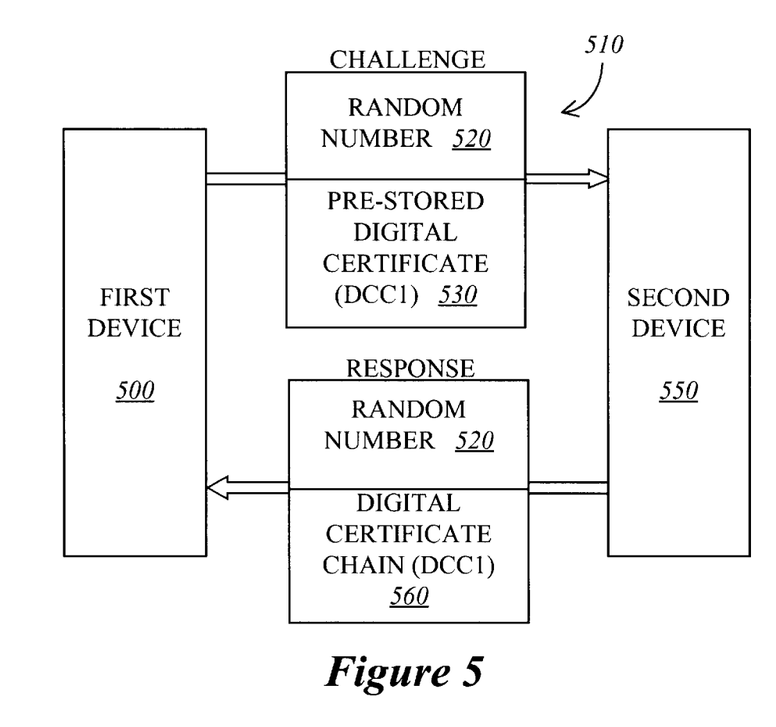
FIG. 5 an embodiment of a challenge/response protocol for establishing a virtual secure path between a device controller of a user input device and the secure processing unit of FIG. 3.

Referring now to FIG. 5, an embodiment of the challenge/response protocol is shown. A first cipher function is executed by a first device 500 (e.g., processing unit $205_M$ of FIG. 3) and issues a challenge 510 to a second device 550, namely the device controller 240 employed within the user input device of FIG. 2. For this embodiment, "challenge" 510 may include a random number 520 and the pre-stored digital certificate chain 530 (e.g., DCC2 341 associated with processing unit $205_M$). Executing a second cipher function complementary to the first cipher function, second device 550 responds by returning at least the random number 520 and a digital certificate chain pre-stored in the user input device 560 (e.g., DCC1 260). The exchange of the digital certificate chains 530 and 560 allows first device 500 and second device 550 to mutually authenticate each other. Thereafter, a session key may be created between the two devices 500 and 550 based on a well-known Diffie-Hellman technique as described in U.S. Pat. No. 4,200,770.

In lieu of or in addition to using session keys to provide confidentiality of the data transmitted via the secure virtual path, an integrity check value (ICV) may be produced to protect the integrity of the data. The ICV may be produced by a Toplitz matrix hash function as described in FIG. 8. Herein, the session key (or a portion thereof) 600 is input into the first cipher function to produce a pseudo-random data stream 610. This data stream 610 is an One-Time Pad (OTP). Certain bits of the OTP are selected to produce an "integrity" or Toplitz matrix as described in FIGS. 7–8. The bit selection is based on predetermined bit locations within the OTP, although the determination itself may be dependent on other bits in the OTP. As shown by performing bitwise multiplication on information routed to the integrated display device and corresponding rows of the matrix followed by separate exclusive OR (XOR) operations on the resultant values along columns of the matrix, an integrity check value (ICV) is produced.

Figure 6:
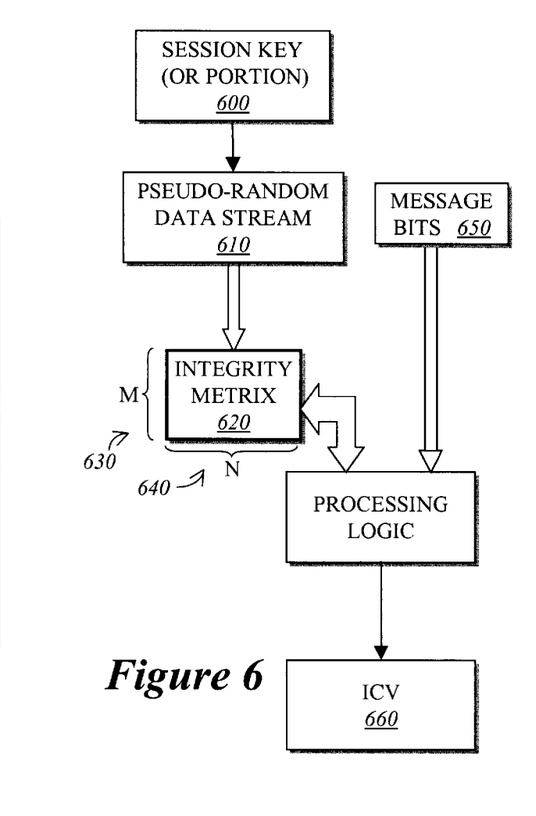
FIG. 6 is a block diagram illustrating a first embodiment for producing an integrity check value (ICV) to accompany sensitive information transferred from the device controller to the secure processing unit.

Referring still to FIG. 6, a block diagram illustrating a first embodiment for producing an ICV to accompany information transferred from the device controller to the secure processing unit is shown. For this embodiment, pseudo-random data stream 610 produced by the secure processing unit (and/or the device controller) includes a plurality of bits (e.g., sixty-four bits "$r_{00}$–$r_{63}$"). A selected number of pseudo-random bits are extracted from pseudo-random data stream 610 in order to produce an integrity matrix 620. Herein, for this embodiment, the pseudo-random bits include $r_{00}$–$r_{04}$, $r_{10}$–$r_{14}$, $r_{20}$–$r_{24}$, $r_{30}$–$r_{34}$, $r_{40}$–$r_{44}$, $r_{50}$–$r_{54}$, and $r_{60}$–$r_{64}$ as set forth in FIG. 7.

Figure 7:
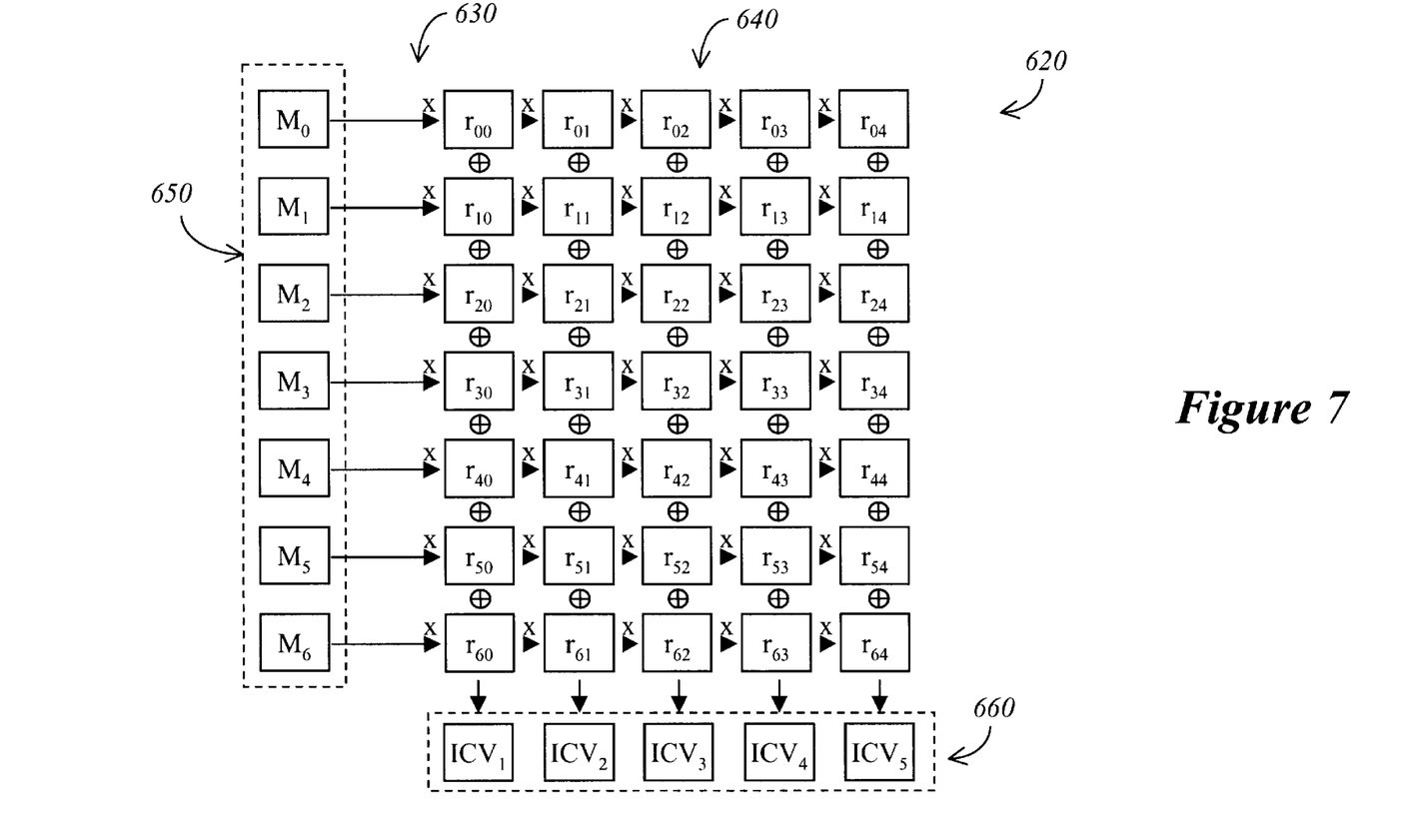
FIG. 7 is a block diagram illustrating an integral matrix to produce the ICV of FIG. 7.

In FIG. 7, integrity matrix 620 includes M rows 630, which correspond to the number (M) of bits 650 received for each transfer cycle in order to compute ICV 660 ("M" is a positive whole number). The number of reiterative transfer cycles needed to load the information and compute ICV 660 is equivalent to the rounded-up whole number result of the size of stream 610 (in bits) divided by M (in bits). Integrity matrix 620 further includes N columns 640, which dictate the size of ICV 660. Thus, the size of ICV 660 is programmable based on the selected column size (N) 640 of integrity matrix 620. The changing of a single bit of the information would require the changing of statistically 50% of the integrity bits, but in an unpredictable pattern. So, the attacker's chance of success would be approximately 1 in $2^N$.

During computations of ICV 660, each group of M bits 630 is bitwise multiplied with each factor of a corresponding row of integrity matrix 620 to produce resultant values. As shown in FIG. 7, bits 650 include seven (M=7) bits identified as $m_0$–$m_6$. Thereafter, within processing logic within device controller 240 or secure processing unit $205_M$, the resultant values of each column of integrity matrix 620 are XOR'ed together to produce a bit of ICV 660. Thus, as shown in Table 1, since integrity matrix 620 includes five columns (N=5), ICV 660 is represented as a five bit result ($ICV_1$–$ICV_5$) and is computed as follows:

TABLE 1

| ICV bit | COMPUTED VALUE |
|---|---|
| $ICV_1$ | $m_0r_{00}$ XOR $m_1r_{10}$ XOR $m_2r_{20}$ XOR $m_3r_{30}$ XOR $m_4r_{40}$ XOR $m_5r_{50}$ XOR $m_6r_{60}$ |
| $ICV_2$ | $m_0r_{01}$ XOR $m_1r_{11}$ XOR $m_2r_{21}$ XOR $m_3r_{31}$ XOR $m_4r_{41}$ XOR $m_5r_{51}$ XOR $m_6r_{61}$ |
| $ICV_3$ | $m_0r_{02}$ XOR $m_1r_{12}$ XOR $m_2r_{22}$ XOR $m_3r_{32}$ XOR $m_4r_{42}$ XOR $m_5r_{52}$ XOR $m_6r_{62}$ |
| $ICV_4$ | $m_0r_{03}$ XOR $m_1r_{13}$ XOR $m_2r_{23}$ XOR $m_3r_{33}$ XOR $m_4r_{43}$ XOR $m_5r_{53}$ XOR $m_6r_{63}$ |
| $ICV_5$ | $m_0r_{04}$ XOR $m_1r_{14}$ XOR $m_2r_{24}$ XOR $m_3r_{34}$ XOR $m_4r_{44}$ XOR $m_5r_{54}$ XOR $m_6r_{64}$ |

Figure 8:
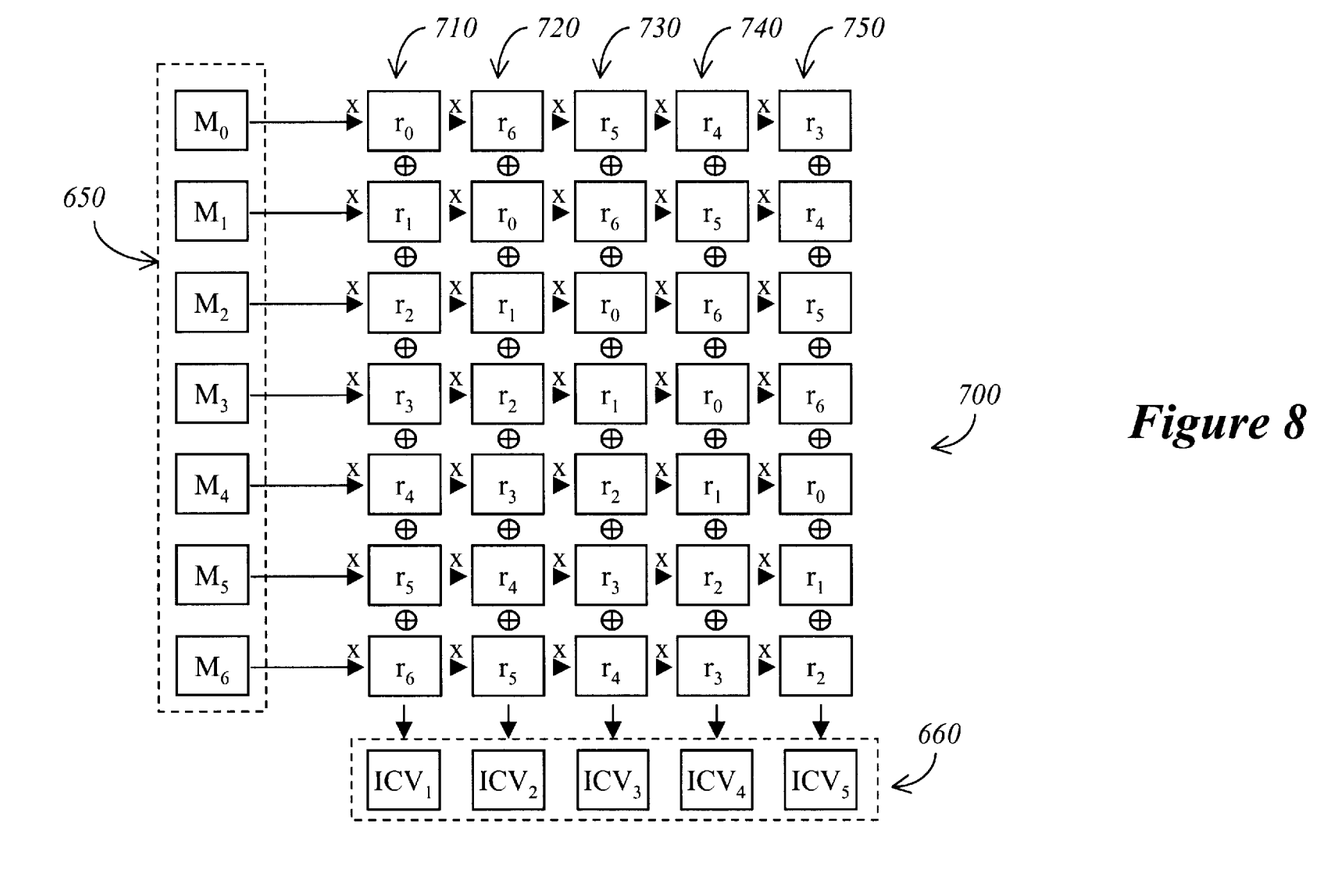
FIG. 8 is a block diagram illustrating a second embodiment for producing an ICV to accompany sensitive information transferred to the secure processing unit.

Referring now to FIG. 8, a block diagram illustrating a second embodiment for producing an ICV to accompany information transferred to the secure processing unit is shown. The information may be in an encrypted or non-encrypted format. This embodiment utilizes a Toplitz matrix 700 in lieu of integrity matrix 620 of FIG. 7. The reason is that it is expected that integrity matrix 620 would be changed in its entirety after each access. This places a significant bandwidth requirement on the pseudo-random bit stream generator.

As shown, Toplitz matrix 700 includes M bits in a first column 710. These bits are repeated in successive columns 720, 730, 740 and 750 of matrix 700, but are rotated by at least one position to fill matrix 700. Thus, only M bits of pseudo-random data are required to repopulate matrix 700 on each access (when $M \geq N$).

During computations of ICV within the device controller, each group of M bits 650 is bitwise multiplied with each pseudo-random bit of a corresponding row of matrix 700 as denoted by "x" in FIG. 8. Thereafter, the resultant values for each column of matrix 700 are XOR'ed together to produce a bit of ICV. Thus, as shown in Table 2, since matrix 700 includes five columns (N=5), ICV 660 is represented as a five bit result ($ICV_1$–$ICV_5$) and is computed as follows:

TABLE 2

| ICV bit | COMPUTED VALUE |
|---|---|
| $ICV_1$ | $m_0 r_0$ XOR $m_1 r_1$ XOR $m_2 r_2$ XOR $m_3 r_3$ XOR $m_4 r_4$ XOR $m_5 r_5$ XOR $m_6 r_6$ |
| $ICV_2$ | $m_0 r_6$ XOR $m_1 r_0$ XOR $m_2 r_1$ XOR $m_3 r_2$ XOR $m_4 r_3$ XOR $m_5 r_4$ XOR $m_6 r_5$ |
| $ICV_3$ | $m_0 r_5$ XOR $m_1 r_6$ XOR $m_2 r_0$ XOR $m_3 r_1$ XOR $m_4 r_2$ XOR $m_5 r_3$ XOR $m_6 r_4$ |
| $ICV_4$ | $m_0 r_4$ XOR $m_1 r_5$ XOR $m_2 r_6$ XOR $m_3 r_0$ XOR $m_4 r_1$ XOR $m_5 r_2$ XOR $m_6 r_3$ |
| $ICV_5$ | $m_0 r_3$ XOR $m_1 r_4$ XOR $m_2 r_5$ XOR $m_3 r_6$ XOR $m_4 r_0$ XOR $m_5 r_1$ XOR $m_6 r_2$ |

Thereafter, a different portion of the OTP is logically XOR'ed with information in its non-encrypted form prior to transmission to processor 310 of FIG. 3. This XOR'ing may be performed in serial bitwise fashion or in parallel with any number of bits in order to encrypt the digital information. Likewise, the ICV may be encrypted through the same XOR operation. This encryption protocol is extremely efficient because both encryption and ICV computation can be performed in a single clock cycle.

At the destination, the secure processing unit utilizes the same type of cipher function to decrypt the incoming information by again XOR'ing that encrypted information with identical portions of the similarly-generated, OTP in order to obtain the information in a non-encrypted form. This mechanism requires that the generation of the two pseudo-random data streams be in synchronization, typically assured by always processing the same amount of information at both the destination and the source. This assures that the pseudo-random data stream is "consumed" at a matching rate by both components. Placement of DES into a counter mode provides easier synchronization. Note that the above procedures are directed to the use of "DES" cipher, but it is anticipated that other stream ciphers that may not use pseudo-random streams may be employed.

Figure 9:
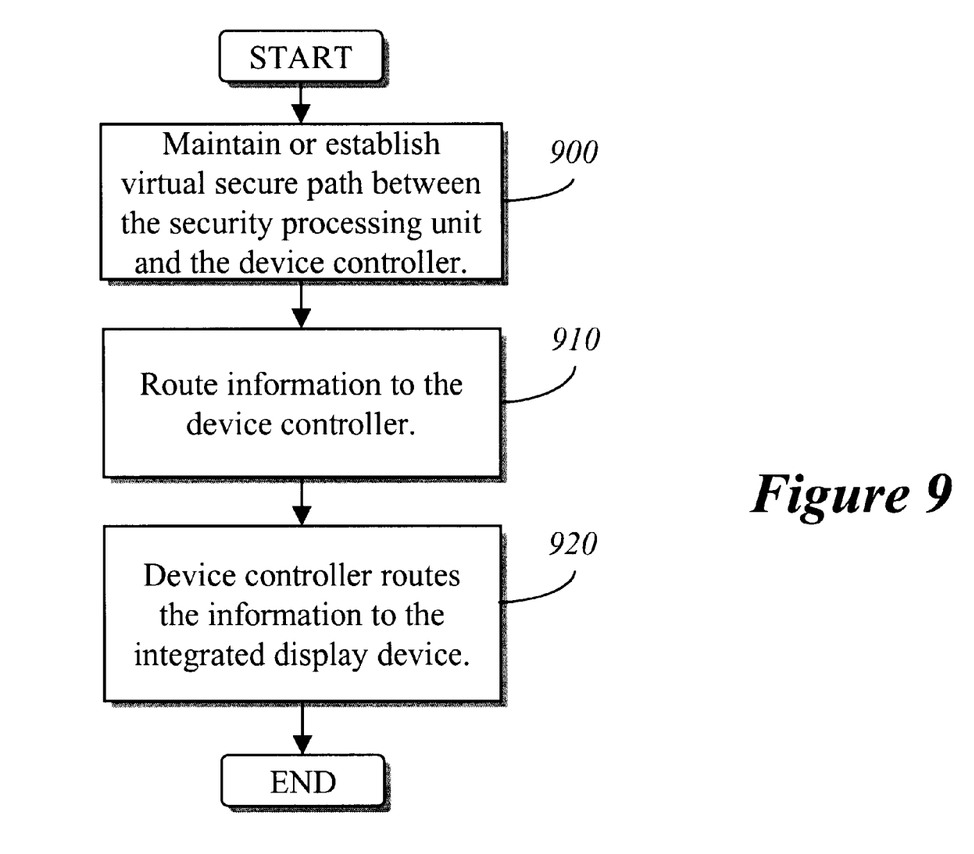
FIG. 9 is an illustrative embodiment of a flowchart of the operations for securely routing information for display on the integrated display device of the user input device of FIG. 2.

Referring to FIG. 9, a flowchart of the operations for securely routing information for display on the integrated display device is shown. Herein, the secure processing unit uses the same or establishes an alternative virtual secure path with the device controller or, in the case where the display device is located on separate peripherals, establishes an alternative virtual secure path with another device controller (block 900). Upon receipt of the display information, the device controller routes the information to the integrated display device of the user input device (blocks 910 and 920). Since information on this display cannot be affected other than through the secured path, the user is assured that such data has not been modified by virus software.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:

inputting sensitive information via a user input device of a computer;

placing a device controller of the user input device into a first mode of operation to securely transfer the sensitive information within the computer from the user input device to a secure processing unit of the computer via a virtual secure path; and activating a security indicator to indicate that the user input device is in the first mode.

2. The method of claim 1, wherein prior to placing the device controller into the first mode of operation, the method further comprises:

establishing the virtual secure path between the device controller and the secure processing unit, the establishment of the virtual secure path includes initiating a challenge by the secure processing unit and returning a response by the device controller.

3. The method of claim 2, wherein the challenge includes a random number and a first pre-stored digital certificate.

4. The method of claim 3, wherein the response includes the random number and a second pre-stored digital certificate.

5. The method of claim 2 further comprising:

receiving the sensitive information by the device controller; and packaging the sensitive information for transmission to the secure processing unit via the virtual secure path.

6. The method of claim 5, wherein the packaging of the sensitive information includes encrypting the sensitive information with session keys generated during establishment of the virtual secure path.

7. The method of claim 1, wherein the activating of the security indicator includes illuminating a light emitting diode placed on the user input device.

8. The method of claim 1 further comprising:

receiving the sensitive information by the device controller; and packaging the sensitive information for transmission to the secure processing unit via the virtual secure path, the packaging of the sensitive information includes generating an integrity check value and transferring the integrity check value with the sensitive information.

9. The method of claim 1, further comprising:

deactivating the security indicator when the device controller is signaled to enter a second mode of operation; and placing the device controller into the second mode of operation.

10. The method of claim 9 further comprising:

providing input information from the user input device to a host processing unit when the device controller is placed in the second mode of operation.

11. The method of claim 1 further comprising:

returning the sensitive information to a display device integrated within the user input device via the virtual secure path.

12. The method of claim 1 further comprising:

establishing a second virtual secure path with the secure processing unit; and transferring the sensitive information to a display device integrated within the user input device via the second virtual secure path.

13. A method comprising:
    establishing a virtual secure path within a computer between a device controller of a user input device of the computer and a secure processing unit of the computer;
    inputting sensitive information via the user input device; and
    placing the device controller of the user input device into a first mode of operation to securely transfer the sensitive information from the user input device to the secure processing unit via the virtual secure path.

14. The method of claim 13 further comprising:
    activating a security indicator when the device controller is placed in the first mode of operation.

15. The method of claim 14, wherein the activating of the security indicator includes illuminating a light emitting diode placed on the user input device.

16. The method of claim 13 further comprising:
    receiving the sensitive information by the device controller; and
    packaging the sensitive information for transmission to the secure processing unit via the virtual secure path.

17. The method of claim 16, wherein the packaging of the sensitive information includes encrypting the sensitive information with session keys generated during establishment of the virtual secure path.

18. The method of claim 13 further comprising:
    returning the sensitive information to a display device integrated within the user input device via the virtual secure path.

19. The method of claim 13 further comprising:
    establishing a second virtual secure path between the device controller and the secure processing unit; and
    transferring the sensitive information to a display device integrated within the user input device via the second virtual secure path.

20. A platform computer comprising:
    a chassis;
    a secure processing unit implemented within the chassis; and
    a user input device implemented within the chassis, the user input device including
        a device controller in communication with the secure processing unit, the device controller to operate in a first mode of operation to establish within the computer a virtual secure path between the device controller and the secure processing unit, the device controller to package sensitive information before transfer to the secure processing unit,
        a security indicator to indicate when the device controller is in the first mode of operation.

21. The computer of claim 20, wherein the user input device further includes a display device to display the sensitive information before transmission from the platform.

22. The computer of claim 20, wherein prior to placing the device controller into the first mode of operation, the virtual secure path is established between the device controller and the secure processing unit by the secure processing unit initiating a challenge and by the device controller returning a response.

23. The computer of claim 22, wherein the challenge includes a random number and a first pre-stored digital certificate.

24. The computer of claim 23, wherein the response includes the random number and a second pre-stored digital certificate.

25. The computer of claim 22, the device controller to receive the sensitive information and to package the sensitive information for transmission to the secure processing unit via the virtual secure path.

26. The computer of claim 25, the device controller to package the sensitive information by encrypting the sensitive information with session keys generated during establishment of the virtual secure path.

27. The computer of claim 20, wherein the security indicator is to illuminate a light emitting diode placed on the user input device.

28. The computer of claim 20, the device controller to receive the sensitive information and to package the sensitive information for transmission to the secure processing unit via the virtual secure path, the sensitive information to be packaged by generating an integrity check value and transferring the integrity check value with the sensitive information.

29. The computer of claim 20, wherein the device controller is to be placed into the second mode of operation when signaled to enter a second mode of operation, and the security indicator to be deactivated when the device controller is to be placed into the second mode of operation.

30. The computer of claim 29, wherein the device controller is to provide input information from the user input device to a host processing unit when the device controller is placed in the second mode of operation.

31. The computer of claim 20, further comprising a display device integrated within the user input device, the device controller to provide the sensitive information received via the virtual secure path to the display device.

32. The computer of claim 20, the device controller further to establish a second virtual secure path with the secure processing unit, the sensitive information to be transferred via the second virtual secure path to the device controller and to a display device integrated within the user input device.

* * * * *